United States Patent Office 3,460,269
Patented Aug. 12, 1969

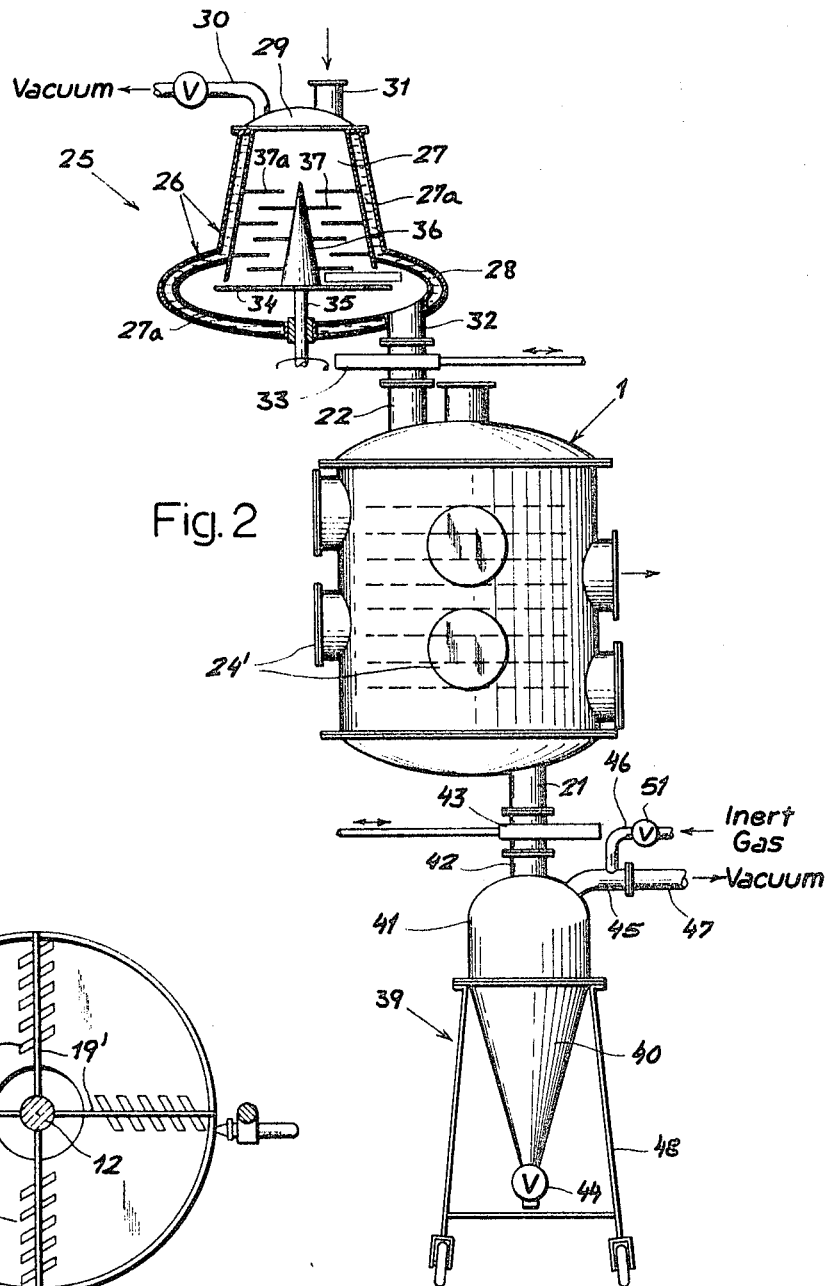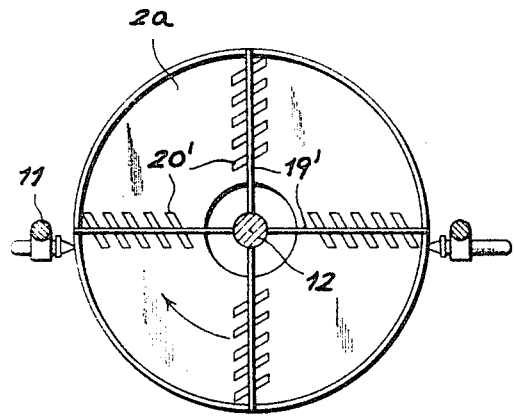

3,460,269
PROCESS AND APPARATUS FOR VACUUM-
DRYING BULK MATERIALS
Heinz Gerhard Kessler, Munich, Germany, assignor to
Krauss-Maffei A.G., Munich-Allach, Germany, a corporation of Germany
Filed Aug. 1, 1967, Ser. No. 657,683
Claims priority, application Germany, Aug. 10, 1966,
K 59,998
Int. Cl. F26b 17/16, 17/22
U.S. Cl. 34—92   7 Claims

ABSTRACT OF THE DISCLOSURE

Free-flowing bulk materials admixed with a sublimable substance (e.g., ice, such as frozen foodstuffs, are continuously treated in a vacuum chamber by being moved with constant agitation over successive hot surfaces advantageously to progressively lower levels with consequently lower temperatures and partial pressures. These surfaces are formed by a stack of heated annular disks with alternately smaller and larger inner and outer diameters, the disks being swept by continuously rotating scraper blades acting radially inwardly in the case of the larger disks and radially outwardly in the case of the smaller disks whereby the goods are alternately pushed over the inner and outer edges of successive disks onto the next-lower disk and, finally, onto the floor of the chamber.

---

My present invention relates to a process and an apparatus for the removal, in vacuo, of sublimable substances from free-flowing bulk materials, e.g., for the purpose of drying frozen foodstuffs or the like by subliming the accompanying ice.

The general object of this invention is to provide a process for expediting the vacuum sublimation and insuring a rapid and uniform treatment of the goods, along with simple machinery for carrying out the process.

Another object of the invention is to provide means for more effectively utilizing available heating surfaces in a vacuum chamber for the purpose described.

These objects are realized, pursuant to my invention, by a continuous stirring of the material to be treated as the latter rests on a hot surface in a vacuum chamber. Advantageously, for maximum efficiency, the stirring is so carried out that the material is moved thereby to progressively lower levels on the hot surface which for this purpose may be suitably subdivided. Thus, a preferred apparatus for carrying out the present process comprises a set of vertically stacked, spacedly superpositioned plates with staggered edges so arranged that the goods are swept over the edges of each higher plate onto a projecting edge portion of the next-lower plate, and ultimately onto the floor of the surrounding vacuum chamber, by sets of scraper blades which perform the stirring. For the sake of compactness, the scraping motion may occur in opposite directions on successively lower plates; in a particularly convenient arrangement of this type, the blades are shaped as annular disks whose inner and outer diameters are alternately shorter and longer, the goods being pushed over the inner peripheries of the large-radius disks and over the outer peripheries of the small-radius disks by the suitably inclined scraper blades.

The above and other features of my invention will become more fully apparent from the forthcoming detailed description, reference being made to the accompanying drawing in which:

FIG. 2 is a somewhat diagrammatic view, partly in section, at a plant showing the chamber of FIG. 1 together with associated loading and unloading equipment therefor; and FIG. 3 is a top view taken on the line III—III of FIG. 1.

Figure 1:
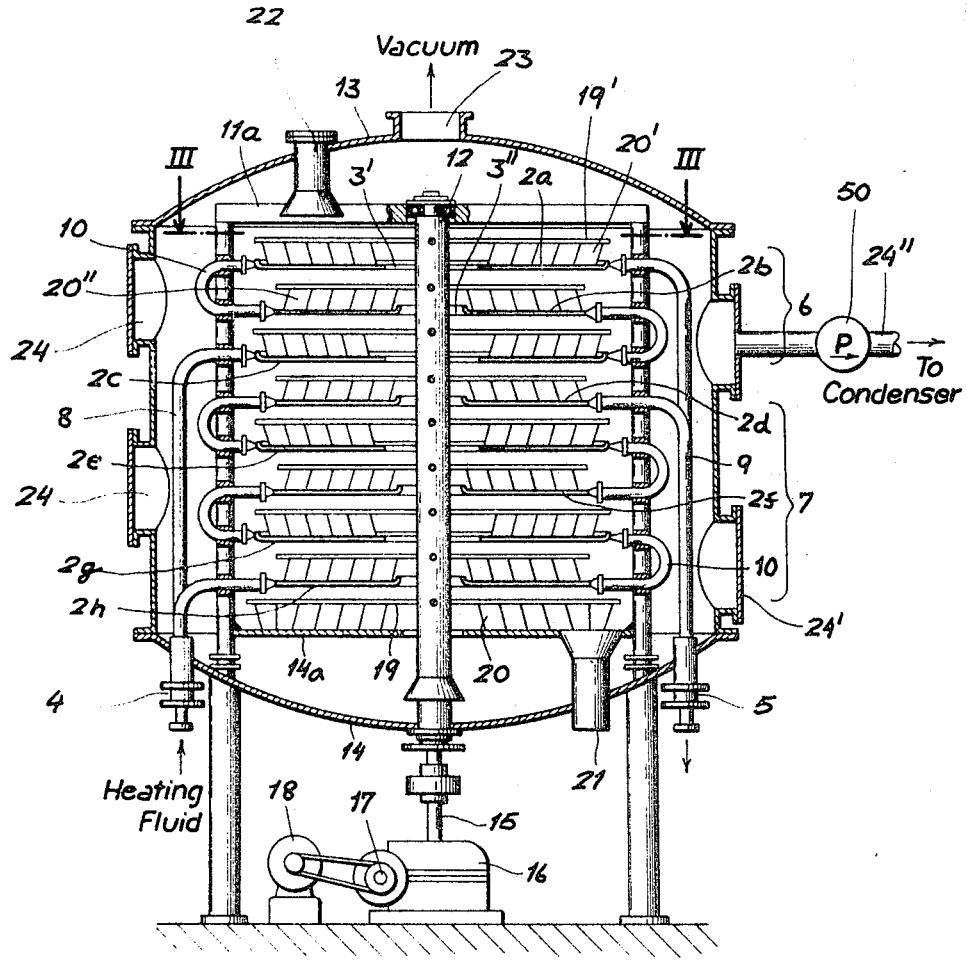
FIG. 1 is an elevational sectional view of a vacuum chamber with stacked heating plates and continuously operable stirring means according to the invention.

The apparatus shown in the drawing may be used for the continuous drying of frozen goods such as, for example, powdered milk, coffee and fruit-juice granulate, diced carrots and meat, or frozen banana shavings and mushroom slices. A vacuum chamber 1 is supported by posts 11 extending into the interior thereof and terminating at the top in a cross-beam 11a forming an upper journal for a vertical shaft 12 which is also rotatably held in the bottom 14 of the chamber housing and is driven by a motor 18 via a transmission 17, a speed reducer 16 and a coupling 15 which may include a slipping clutch. Shaft 12 passes with annular clearance through central apertures 3', 3" in a stack of horizontal annular disks 2a, 2b, 2c, 2d, 2e, 2f, 2g, 2h fixedly mounted on the posts 11 through the intermediary of conduits 8, 9 and 10. The disks are hollow and receive a heating fluid, such as steam, from an inlet nozzle 4 via conduits 8 terminating at disks 2c and 2h; connecting pipes 10 direct this fluid through successively higher disks until it leaves via conduits 9, attached to disks 2a and 2d, for discharge at an outlet nozzle 5. Thus, the 8 disks shown in FIG. 1 are subdivided into two groups 6 and 7 of three and five disks, respectively, with separate circulation; the temperature of these two groups can therefore be individually adjusted.

Counting from above, one notes that the odd-numbered disks 2a, 2c, 2e and 2g have longer inner and outer diameters whereas the even-numbered disks 2b, 2d, 2f and 2h have shorter diameters. Shaft 12 carries outrigger arms 19', 19" which support respective sets of scraper blades 20', 20" so arranged as to sweep the goods on the large-radius disks 2a, 2c, etc., inwardly toward and into their central openings 3' and the goods on the small-radius disks 2b, 2d, etc., outwardly toward and over the outer edges thereof. From the lowest disk 2h the goods drop onto the floor 14a which is swept by further scraper blades 20 on outrigger arms 19, the latter blades being so oriented as to concentrate the dehydrated material at an outlet 21 through which it may leave the chamber.

An inlet 22 for the material to be treated opens onto the top disk 2a. The lid 13 of chamber 1 also has a central port 23 conectable to a vamuum pump not shown. Side ports 24, normally closed by covers 24', give access to the interior of the chamber for purposes of inspection and repair. One of these side ports is provided with a conduit 24" leading, via a suction pump 50, to a condenser (not shown) for the removal of evaporated moisture.

The inlet and outlet ports 22, 21 are provided with gates which can be intermittently opened and whose construction has been illustrated in FIG. 2. The inlet gate, generally designated 25, includes a shutter 33 which may be designed as a solenoid valve and which separates the port 22 from a receptacle 26 for the raw goods introduced through a lid 29 of the receptable via a feeder 31. Receptacle 26, acting as a cooling chamber, has a double wall forming a jacket 27a for the circulation of a refrigerant to prevent the premature evaporation of moisture from the goods stored therein. Lid 29 also has a vacuum connection 30.

The upper part of receptacle 27 is generally frustoconical and is occupied by a fragmentation device comprising a conical boss 36 which rises from a rotatable platter 34 whose shaft, driven by a motor not shown, is journaled in the bottom of the receptacle. Pins 37 and 37a project radially outwardly and inwardly, respectively, from the cone 36 and the confronting inner wall surface of chamber 27 in order that lumps of coherent particles may be broken up. The material so loosened accumulates in the lower, generally ellipsoidal part of 28 of the receptacle preparatorily to its introduction into the treatment chamber 1 upon an opening of shutter 33.

The outlet gate, generally designated 39, comprises a shutter 43 similar to shutter 33 at the inlet. Port 21 communicates, in the open condition of shutter 33, with the interior of a storage vessel 40 having a lid 41 provided with an inlet 42 for the dehydrated material. The interior of vessel 40 is also connectable, via a tubing 45, to a source inert protective gas (e.g., nitrogen) admitted by way of a valve 51 after the vessel has been evacuated through an extension 47 of that tubing. Vessel 40 is supported on a wheeled cariage 48 for ready transportation to a packaging station or other destination for the dehydrated goods. A valve-controlled, normally vacuum-tight outlet 44 for the discharge of the dehydrated goods is provided at the pointed lower end of the conical vessel 40.

It will thus be seen than I have disclosed a system allowing for the continuous agitation and heating of free-flowing bulk materials in a vacuum chamber which can be intermittently opened to a supply source for the goods to be treated and to a receiver for the treated goods.

Naturally, the exact structural details shown and described may be modified in various respects without departing from the spirit and scope of my invention as defined in the appended claims.

I claim:

1. An apparatus for drying bulk material admixed with a sublimable substance, comprising a vessel provided with exhaust means for maintaining a vacuum therein; a plurality of spacedly superpositioned substantially horizontal heatable plates, each lower plate having an edge projecting beyond the corresponding edge of the next-higher plate; and agitator means including a plurality of unidirectionally effective scraper elements respectively overlying said plates for continuously stirring said material and sweeping same over an edge of each higher plate onto the projecting edge of the next-lower plate.

2. An apparatus as defined in claim 1 wherein said plates have pairs of inversely staggered opposite edges, said spacer elements being mounted for displacement of said material in opposite directions on succesive plates.

3. An apparatus as defined in claim 2 wherein said plates are annular disks with alternately longer and shorter radii, said scraper elements being movable radially inwardly on each longer-radius disk and radially outwardly in each shorter-radius disk.

4. An apparatus as defined in claim 3 wherein said scraper elements are provided with drive means including an upright shaft passing centrally through said disks with clearance from their inner peripheries.

5. An apparatus as defined in claim 1 wherein said vessel is provided with an inlet for said material, further comprising a cooling chamber in said inlet, fragmentation means in said cooling chamber and intermittently openable gate means separating said cooling chamber from the interior of said vessel.

6. An apparatus as defined in claim 5 wherein said fragmentation means comprises a rotatable platter having a generally conical boss rising centrally therefrom, said boss and the inner wall of said cooling chamber being provided with interleaved spikes for breaking up lumps deposited on said platter from above.

7. An apparatus as defined in claim 1 wherein said vessel is provided with an outlet for said material, further comprising a storage chamber in said outlet, conduit means for admitting a protective gas to said storage chamber, and intermittently openable gate means separating said storage chamber from the interior of said vessel.

References Cited

UNITED STATES PATENTS

| 1,275,547 | 8/1918 | Forrest | 34—92 |
| 2,411,152 | 11/1946 | Folson | 34—5 |
| 3,247,600 | 4/1966 | Togashi | 34—5 |
| 3,263,335 | 8/1966 | Kan | 34—5 |
| 3,264,747 | 8/1966 | Fuentevilla | 34—5 |
| 3,308,552 | 3/1967 | Kaufman | 34—92 |

FOREIGN PATENTS 948,517  2/1964  Great Britain.

WILLIAM J. WYE, Primary Examiner